Figure 1:
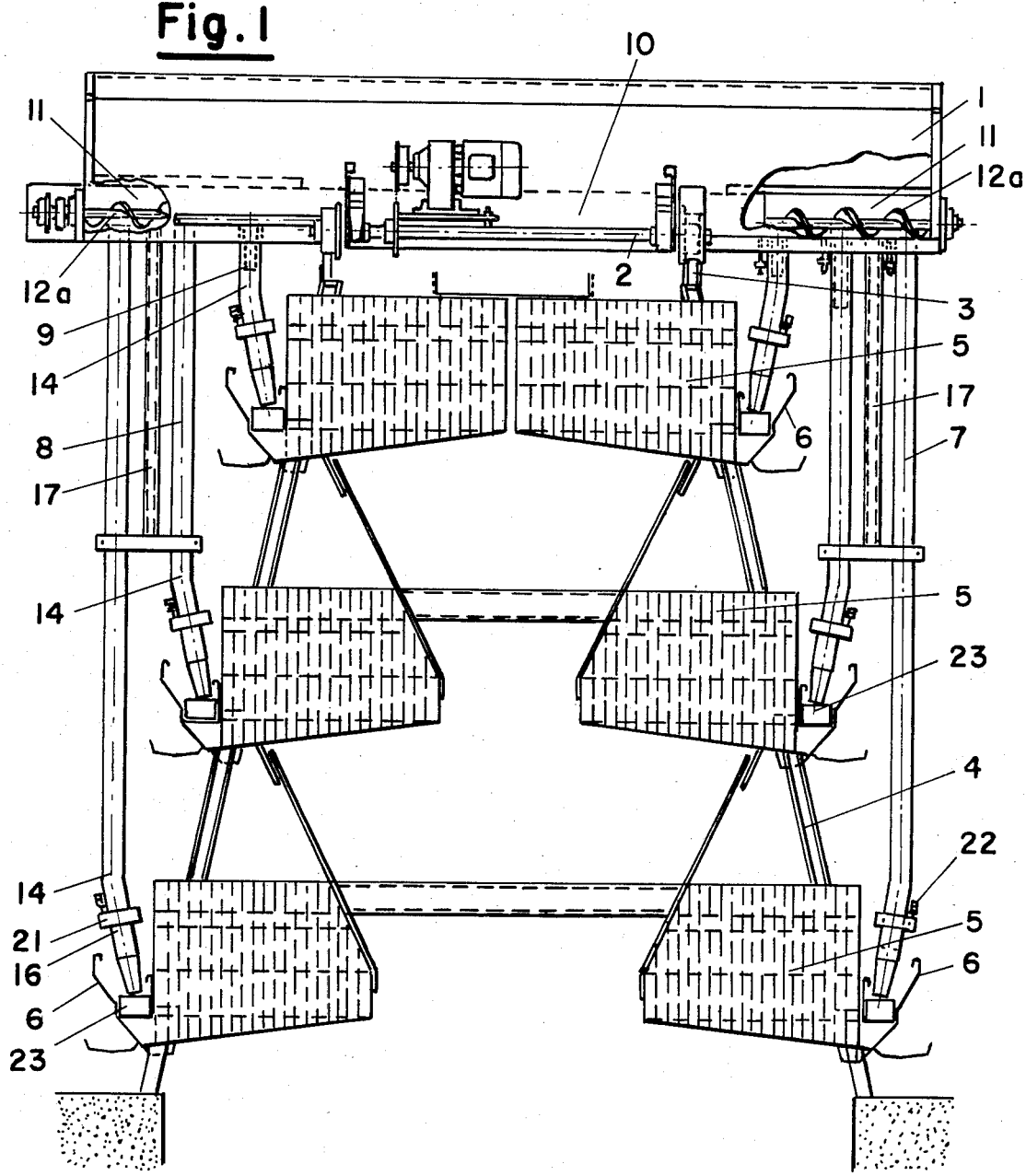

United States Patent [19]

Tudela

[11] Patent Number: 4,597,361
[45] Date of Patent: Jul. 1, 1986

[54] FEED PROPORTIONER

[75] Inventor: Manuel R. Tudela, Reus, Spain

[73] Assignee: USI Agri-Business Company Inc., New Holland, Pa.

[21] Appl. No.: 585,131

[22] Filed: Mar. 1, 1984

[51] Int. Cl.$^4$ .......................................... A01K 39/012
[52] U.S. Cl. ................................................... 119/52 B
[58] Field of Search ................. 119/22, 52 AF, 52 B, 119/18

[56] References Cited

U.S. PATENT DOCUMENTS

| | | | |
|---|---|---|---|
| 3,312,194 | 4/1967 | Ernst | 119/22 |
| 4,089,300 | 5/1978 | Keen et al. | 119/52 AF |
| 4,195,594 | 4/1980 | Siciliano | 119/52 B |

FOREIGN PATENT DOCUMENTS 7705621  11/1978  Netherlands ..................... 119/52 B Primary Examiner—Hugh R. Chamblee
Attorney, Agent, or Firm—Price, Heneveld, Huizenga & Cooper

[57] ABSTRACT

In a fodder or feed supply system, a hopper is provided from which duct means downwardly extends to troughs or channels out of which poultry eat. On the end of the duct means is provided dispenser mouthpieces each of which rest on a shoe which controls the depth of the fodder in the channel. Each shoe includes an inclined surface on which the fodder falls between spaced wings that contain the fodder and dispense the same through openings in the wings. The mouthpieces are each slidably mounted on a duct and forced downwardly by a counterweight.

5 Claims, 5 Drawing Figures

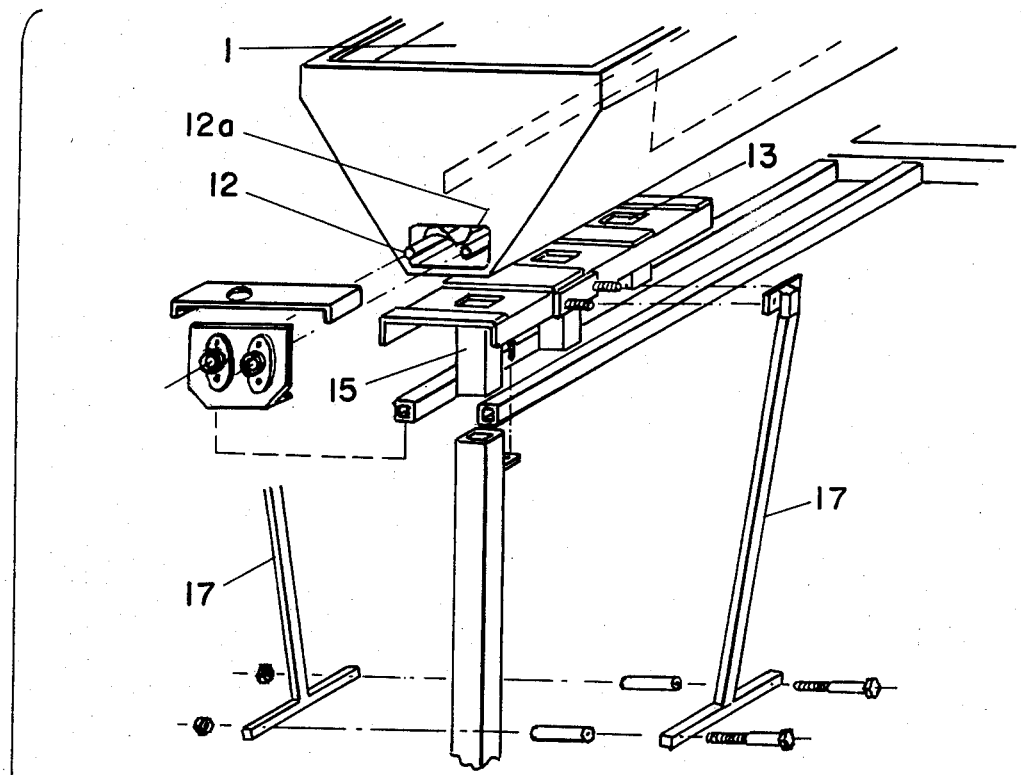
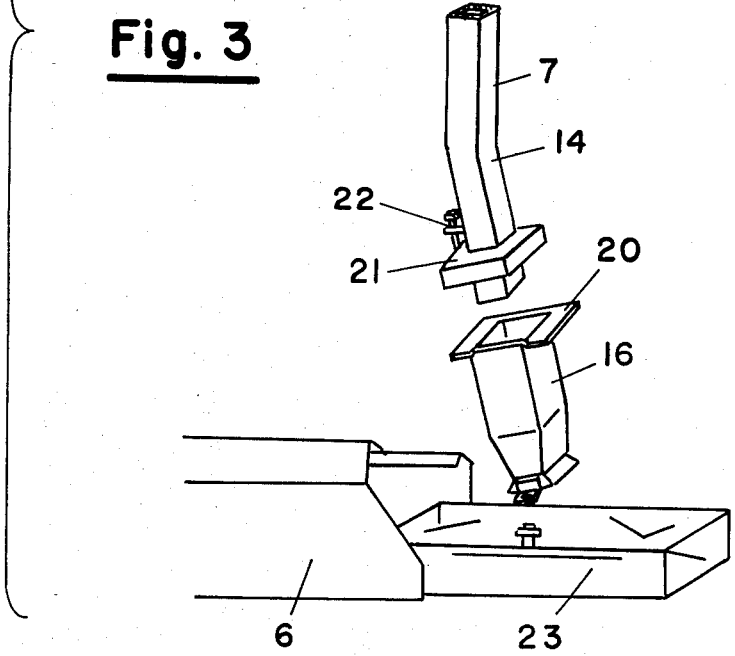
Fig. 3

FEED PROPORTIONER

The invention relates to an improved apparatus for measuring out fodder.

The feeding of animals reared in cages has to be adequately controlled in measuring it out, with the aim of obtaining optimum growth of the said animals, which will provide a yield in the plant that will permit reaching the levels of production necessary to be economically profitable.

The control of feeding, in installations of a certain size, has to be carried out automatically, since it would be excessively expensive for this control to be effected manually, given that numerous persons dedicated to this aim would be required and this has a direct, negative repercussion on the profits of the plant.

The known fodder metering apparatuses applicable to plant for the rearing of caged animals belong to a conventional type of design according to the present state of the art, and have not provided solutions suitable for achieving the aims pursued by the present invention, the distinguishing feature of which resides in providing a metering system which can be regulated as a function of requirements and that once the parameters which establish the quantity of fodder deposited in the troughs have been fixed, it offers a uniform distribution in the whole battery of cages.

To this end, the present apparatus for measuring out fodder is of the type which comprises a silo in the form of a hopper which is disposed transversely and which is mounted on a carriage which advances along a track integral with the structure in which the battery of cages is supported. In the cages, apertures are provided for access to the channels which fulfill the function of feeding-places and in which is distributed the fodder coming from the hopper, by means of ducts to which the fodder is conducted by mechanical means.

The hopper is longitudinally divided into two equal zones by means of a separating partition having two end apertures, each of the zones of the hopper being provided with a helicoid [sic] or Archimedean screw whose direction of advance is opposed to that of the other, such that there is established a fodder displacement circuit in the hopper from one zone to the other passing through the fodder exit apertures. The said exit apertures are directed towards the ducts which conduct the fodder to the channels provided in each one of the levels of the battery of cages.

The fodder ducts are constituted by tubular bodies of quadrangular cross section and which comprise an elbowed section which, at the part opposed to the elbow, sheathes a tubular core descending from the hopper, while its opposed end is sheathed by a terminal mouthpiece. The said fodder ducts incorporate conventional fastening and stiffening means.

The terminal mouthpieces of the fodder ducts have an end shape which alters [literally, 'breaks'] the mouth of the exit section, lengthening it, while the end for connection to the duct is provided with respective opposed wings on which is supported a counterpoise constituted by a solid frame which tends to descend, the descent being limited by an adjustable height stop provided on the respective duct.

The end mouthpieces rest on, and are connected to, a shoe which slides along the channel. The said shoe, under the end mouthpiece, has a descending inclined plane which constitutes a fodder deflector, the sides of which are convergent and are formed by an edge plate which forms respective wings disposed diagonally with respect to the channel. In the wings are provided respective apertures in each of which fit adjustable gates to determine the volume of the fodder, the said plate being integral with a back which is slidable against the wall of the channel.

The slidable back ends in respective conditioning partitions disposed at an opposite angle with respect to that formed by the diagonal wings which determined the gathering up and conditioning of the fodder during the cyclic strokes executed by the shoe. Below the deflector, the shoe has a support rib with bent ends to constitute slidable legs.

In order to suitably illustrate what has been set out above, three sheets of drawings accompany the present descriptive report and form an integral part of it; in them, a purely illustrative example, not limiting the practical possibilities of embodiment, is shown in a simplified and schematic manner.

In FIG. 1 is shown a cross sectional view of the whole apparatus, in which can be appraised the principal elements which constitute the metering apparatus.

Figure 2:
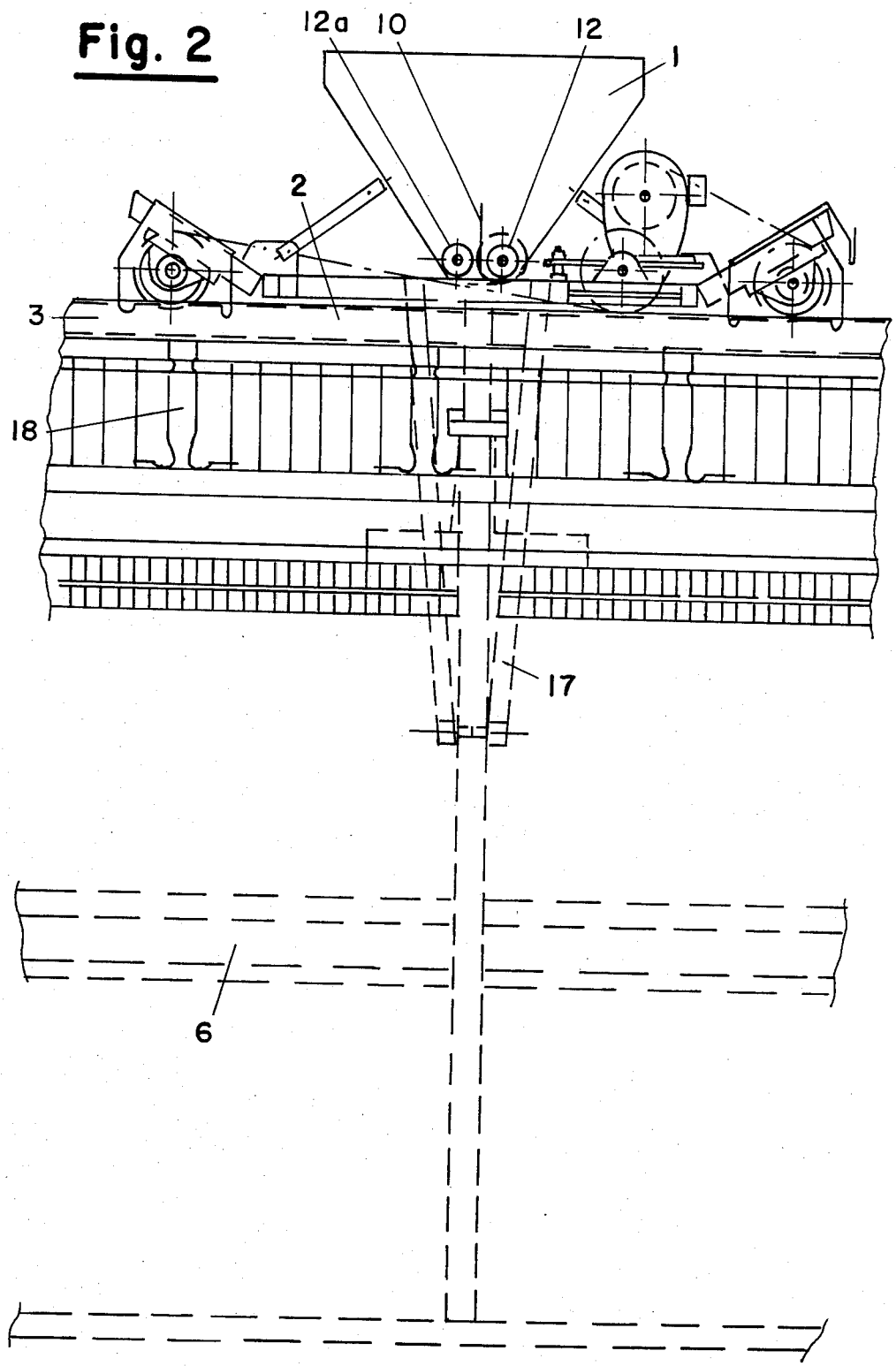

In FIG. 2 is shown a lateral view of the metering apparatus, in which can be seen the disposition of the carriage of the hopper with respect to the battery of cages.

In FIG. 3 there is shown a perspective view of the feed system of the metering apparatus.

Figure 4:
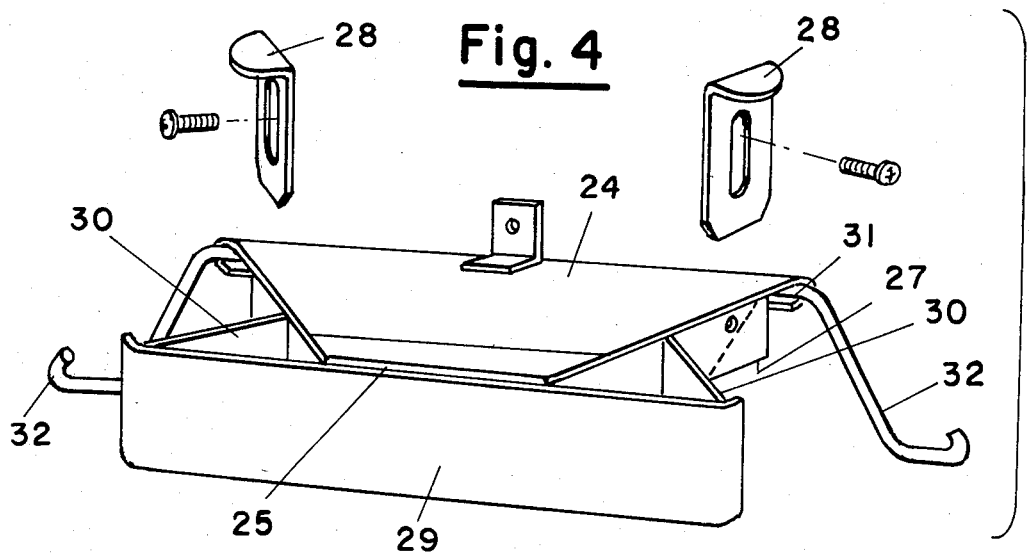

In FIG. 4 is shown in perspective the shoe which proportions [or, 'provides'—Trans.] the delivery of the fodder into the feeding-places.

Figure 5:
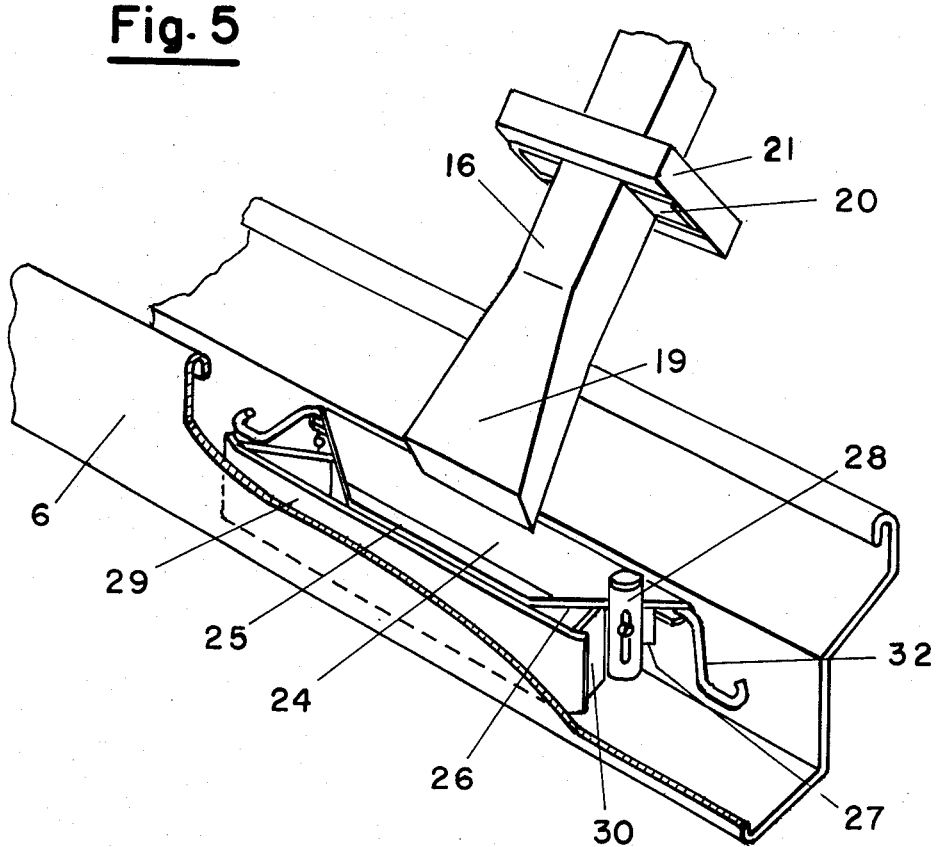

In FIG. 5 there is shown the shoe in its operating location.

Based on the above figures, the following references are assigned: 1 hopper, 2 carriage, 3 track, 4 structure, 5 cages, 6 channels, 7, 8 and 9 ducts, 10 separating partition of the hopper, 11 apertures, 12a Archimedian screws, 12 exit apertures, 14 elbowed length, 15 tubular core, 16 terminal mouthpiece, 17 stays, 18 access aperture, 19 end deformation of the terminal mouthpiece, 20 opposed wings, 21 counterweight, 22 adjustable stop, 23 shoe, 24 inclined plane, 25 plate, 26 diagonal wings, 27 apertures, 28 gates, 29 back, 30 partition, 31 support rod, and 32 bent ends of the support rod.

The apparatus for measuring out fodder incorporates in its upper part the hopper 1 which acts as a silo. The said hopper 1 is disposed transversely with respect to the battery of cages 5 and is displaceable by being mounted on the carriage 2, which advances along the track 3 which is integral with the structure 4 of the whole assembly.

The cages 5 have apertures 18 which permit access by the animals to the channels 6 which have the function of feeding-places. The fodder coming from the hopper 1 is distributed in the channels 6 through the ducts 7, 8 and 9.

The hopper 1 is divided longitudinally by means of the separating partition 10 which defines two equal zones, in each of which is disposed [one of] the helicoids or Archimedean screws 12 and the directions of rotation of which are opposed to establish a circuit of displacement of the fodder towards the ends where the separating partition 10 has respective apertures 11 and to the ducts 7, 8 and 9 through the exit apertures 13.

The ducts 7, 8 and 9 are each formed by a tubular body of quadrangular cross section; at a point neighboring their lower end they have an elbowed length 14 and the said end is sheathed in the terminal mouthpiece 16, while at their upper end they sheathe the tubular core 15 which connects to the bottom of the hopper 1. The said ducts 7, 8 and 9 are connected to the structure 4 of the assembly by means of the stays 17, which constitute the means of fastening and stiffening.

The terminal mouthpiece 18 has the end deformation 19 which transversely lengthens the fodder exit section. The end at which the terminal mouthpiece is connected to the corresponding duct 16 has two opposed wings 20 on which is supported the counterweight 21, which is formed by a solid frame whose weight tends to lower the body of the mouthpiece 16, the descent of the said mouthpiece 16 being limited by the stop 22, which is adjustable.

The terminal mouthpiece 16 rests on the shoe 23 which slides along the corresponding channel 6; the shoe has the descending inclined plane 24 which is integral with the plate 25 which is disposed at the edge and whose ends form the diagonal wings 26. The said wings 26 have the apertures 27 which are controlled by the gates 28 to limit the delivery of fodder as required.

The plate 25 is fixed to the back 29 which slides on the wall of the channel 6. The partitions 30 which connect the back 29 to the plate 25 are disposed approximately at 90° with respect to the diagonal wings 26 and constitute the means for gathering and conditioning the fodder during the strokes of the shoe 23 along the channel 6.

The shoe 23, below the descending inclined plane 24, incorporates the support rod 31 whose ends 32 are bent to define legs sliding with respect to the bottom of the channel 6.

The descending inclined plane 24 acts as a deflector for fodder, damping its fall below the channel 6. The plate 25 adopts a semi-involute shape, without ribs, to avoid corners or spaces in which fodder could be left standing when the shoe 23 effects its strokes along the corresponding channel. The angles formed by the partitions 30 and the diagonal wings 26 also favor the passage of the fodder through the shoe 23. The metering of the fodder can be controlled by means of the speed of the carriage 2, or also by adjusting the gates 28.

According to what has been set out in the present descriptive report and shown in the drawings which accompany it, it can be clearly appreciated that the fundametal advantage provided by the invention, as a consequence of the constitutive characteristics of the assembly and of the distribution of the elements which compose it, is based on providing perfect control of the quantity of fodder deposited in the channels which act as feeding-places, this control being derived in a simple and effective manner from economical elements which are easy to mechanize; its installation is found to be appropriate for farms of a certain size, freeing the venture from having to carry out the measuring-out manually or by means of devices which do not guarantee a uniform and constant metering. Finally, the special design of the assembly now under consideration constitutes a practical, competitive metering apparatus which is particularly effective for the task concerned.

Given the description to which the preceding report refers, it is necessary to insist that the details of embodiment of the concept set out can be varied, that is, that small alterations can be made, always based on the fundamental principles of the concept, which are essentially those which are reflected in the following claims.

I claim:

1. Apparatus for dispensing fodder into an elongated fodder channel comprising a hopper for containing said fodder, at least one duct means operatively connected to said hopper and having a dispenser mouthpiece; means for conducting said fodder into said duct means whereby fodder is conducted downwardly through said duct means and mouthpiece into said channel; a shoe located at the end of said mouthpiece in said channel and adapted to slide inside and along said channel as said duct means, including said mouthpiece, is moved along said channel; said shoe comprising deflector means formed to provide an inclined surface spaced above the channel floor and located immediately below the mouthpiece for deflecting the fodder passing through and out of said mouthpiece; said deflector means also having wings spaced from each other longitudinally of said channel and extending downwardly to the floor of said channel and diagonally across said channel for containing said fodder; said wings having openings with adjustable gates for adjustably delivering the fodder into said channel.

2. Apparatus for claim 1 in which a plate is provided extending between vertical edges of said wings and located immediately adjacent one of the walls of said channel for sliding on said wall.

3. The apparatus of claim 2 in which a support rod means is provided to assist in supporting the inclined surface portion of the deflector means above the channel floor, said support rod having bent ends constituting sliding legs that slide on the channel floor.

4. Apparatus for dispensing fodder into an elongated fodder channel comprising a hopper for containing said fodder, at least one duct means operatively connected to said hopper and having a dispenser mouthpiece; means for conducting said fodder into said duct means whereby fodder is conducted downwardly through said duct means and mouthpiece in said channel; a shoe located at the end of said mouthpiece in said channel and adapted to slide inside and along said channel as said duct means, including said mouthpiece, is moved along said channel; said dispenser mouthpiece being slidably mounted on a supported duct of said duct means thereby providing a means for adjusting the length of said duct means, and the end of the dispenser mouthpiece opposite the outlet being provided with opposed wings which support a counterweight that by gravity forces the mouthpiece downwardly.

5. The apparatus of claim 4 in which an adjustable stop is provided on said duct means for limiting the downward position to which the counterweight forces the dispenser mouthpiece.

* * * * *